(12) United States Patent
Tracht et al.

(10) Patent No.: US 7,823,912 B2
(45) Date of Patent: Nov. 2, 2010

(54) MULTIPLE PANEL PAD SHIELD IN A VEHICULAR SIDE BOLSTER FOR SIDE AIRBAG RETENTION AND DEPLOYMENT

(75) Inventors: Michael L. Tracht, Ingolstadt (DE); Rainer Penzel, München (DE)

(73) Assignee: Lear Corporation, Southfield, MI (US)

( * ) Notice: Subject to any disclaimer, the term of this patent is extended or adjusted under 35 U.S.C. 154(b) by 316 days.

(21) Appl. No.: 11/581,548

(22) Filed: Oct. 16, 2006

(65) Prior Publication Data
US 2007/0085308 A1 Apr. 19, 2007

(30) Foreign Application Priority Data
Oct. 17, 2005 (DE) .................... 10 2005 049 573

(51) Int. Cl.
*B60R 21/207* (2006.01)
(52) U.S. Cl. .................. 280/730.2; 280/728.2
(58) Field of Classification Search ........... 280/730.2, 280/728.1, 728.2, 743.1
See application file for complete search history.

(56) References Cited

U.S. PATENT DOCUMENTS

| | | | | |
|---|---|---|---|---|
| 5,601,332 | A * | 2/1997 | Schultz et al. | 297/216.13 |
| 5,816,610 | A | 10/1998 | Higashiura et al. | |
| 5,851,024 | A * | 12/1998 | Satani et al. | 280/730.2 |
| 5,860,673 | A | 1/1999 | Hasegawa et al. | |
| 5,863,063 | A | 1/1999 | Harrell | |
| 5,927,749 | A * | 7/1999 | Homier et al. | 280/730.2 |
| 5,938,232 | A | 8/1999 | Kalandek et al. | |
| 5,967,603 | A * | 10/1999 | Genders et al. | 297/216.13 |
| 6,045,151 | A | 4/2000 | Wu | |
| 6,062,593 | A * | 5/2000 | Satani et al. | 280/730.2 |
| 6,237,934 | B1 | 5/2001 | Harrell et al. | |
| 6,352,304 | B1 * | 3/2002 | Sorgenfrei | 297/216.13 |
| 6,578,911 | B2 * | 6/2003 | Harada et al. | 297/216.13 |
| 6,588,838 | B1 | 7/2003 | Dick, Jr. et al. | |

(Continued)

FOREIGN PATENT DOCUMENTS

DE 29923578 U1 10/1999

(Continued)

OTHER PUBLICATIONS

Combined Search and Examination Report under Sections 17 & 18(3), Appl'n. No. GB0620319.4.

(Continued)

*Primary Examiner*—Paul N Dickson
*Assistant Examiner*—Timothy D Wilhelm
(74) *Attorney, Agent, or Firm*—Brooks Kushman P.C.

(57) ABSTRACT

A vehicle seat assembly includes a frame for mounting the seat to a vehicle. The seat assembly also includes a seat pad molded from a polymeric material and located proximate the frame. A trim cover is disposed over the seat pad, and includes a seam adjacent a side of the seat pad. An airbag assembly, which includes an airbag and an inflator configured to supply gas to the airbag, is also part of the seat assembly. A pad shield covers at least a portion of the seat pad for protecting it during deployment of the airbag. The pad shield includes inner and outer panels which form a deployment channel for the airbag, and thereby inhibit contact of the airbag with the seat pad as the airbag deploys.

7 Claims, 3 Drawing Sheets

U.S. PATENT DOCUMENTS

| | | |
|---|---|---|
| 6,886,858 B2 | 5/2005 | Olson |
| 2004/0239081 A1 | 12/2004 | Tredez |
| 2005/0057030 A1 | 3/2005 | Fischer et al. |
| 2005/0116453 A1 | 6/2005 | Geum |
| 2005/0121890 A1 | 6/2005 | Kong |

FOREIGN PATENT DOCUMENTS

| | | |
|---|---|---|
| EP | 1069004 A2 | 1/2001 |
| GB | 2322603 A | 9/1998 |
| GB | 2420759 A | 6/2006 |
| GB | 2420763 A | 6/2006 |
| GB | 2420755 A | 7/2006 |
| GB | 2420758 A | 7/2006 |
| JP | 08258660 A | 10/1996 |
| WO | 9915375 A1 | 4/1999 |

OTHER PUBLICATIONS

Examination Report dated Jan. 21, 2008; Application No. GB0620319.4.

* cited by examiner

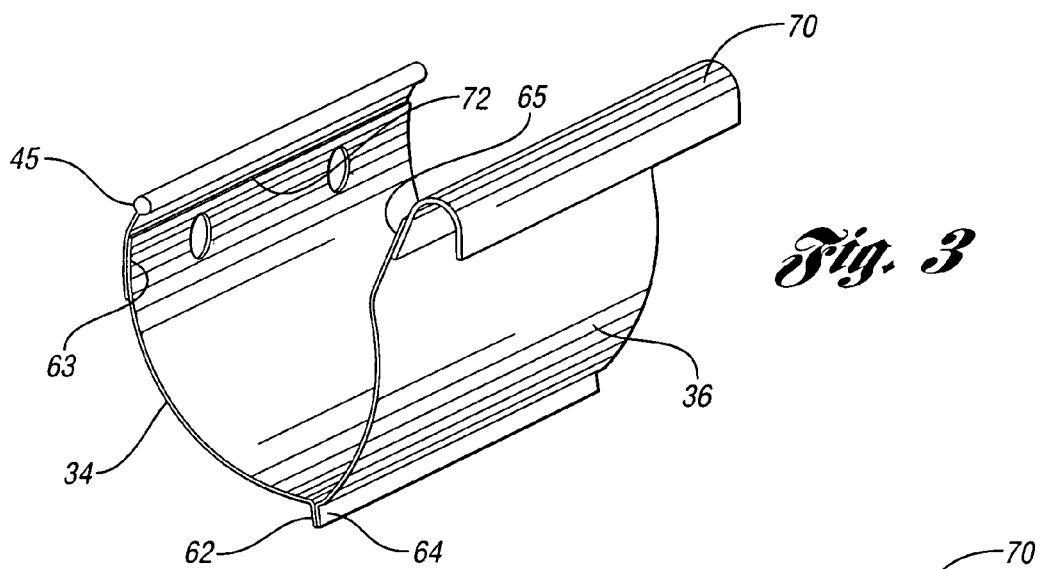
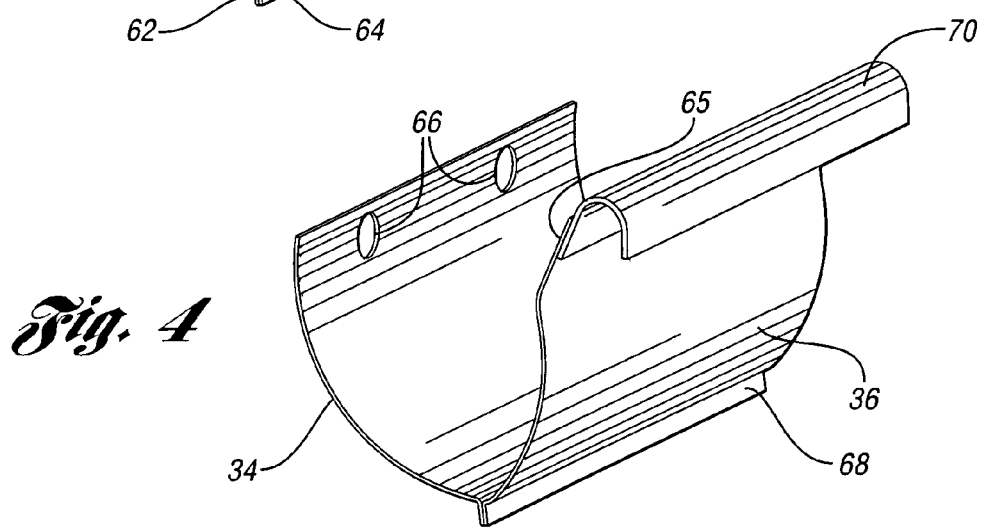
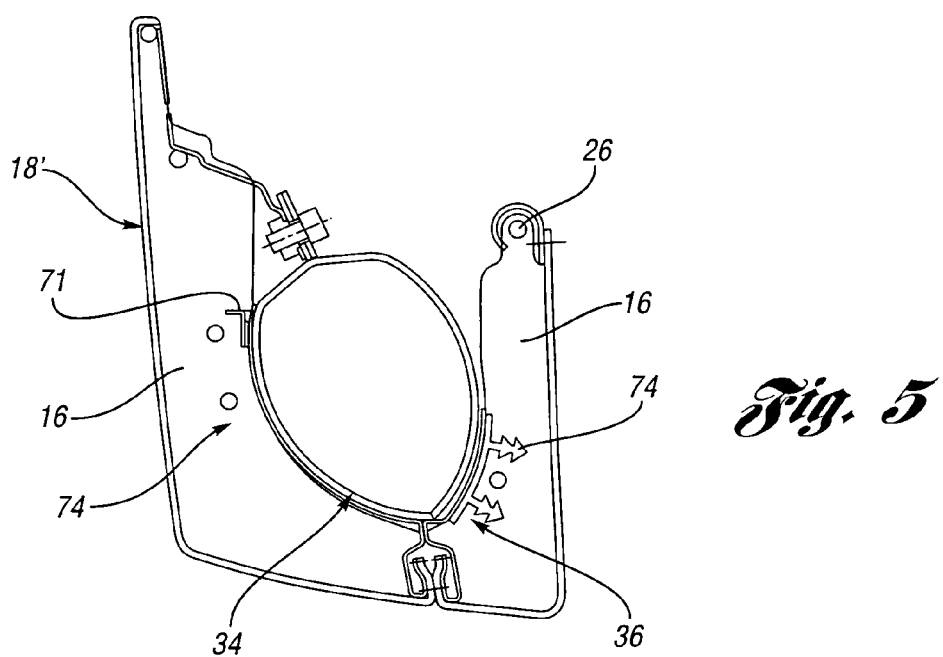

MULTIPLE PANEL PAD SHIELD IN A VEHICULAR SIDE BOLSTER FOR SIDE AIRBAG RETENTION AND DEPLOYMENT

CROSS-REFERENCE TO RELATED APPLICATIONS

This application claims foreign priority benefits under 35 U.S.C. §119(a)-(d) to DE 10 2005 047 573 7, filed Oct. 17, 2005, which is hereby incorporated by reference in its entirety. This application related to commonly owned U.S. Pat. Nos. 7,290,792; 7,357,412; and US Publication No. 20060113764. These documents are incorporated herein by reference.

DESCRIPTION

1. Field of the Invention

The invention relates to a vehicle seat assembly, and in particular, a seat assembly with a pad shield having multiple panels in a rear backrest thereof for retaining and deploying a side airbag.

2. Background Art

Vehicles today are often equipped with side airbags, which may be in the form of a side air curtain disposed in a headliner of the vehicle, or alternatively, may be an airbag disposed within a vehicle seat assembly. One limitation of airbags that are located within a seat assembly is that the airbag needs to break through the seating material before it can fully deploy to protect a vehicle occupant. During deployment, such an airbag may encounter foam or other seat pad materials, and must then break through a seat trim cover in order to escape from the seat assembly.

A number of attempts have been made to facilitate deployment of airbags from and through a vehicle seat assembly. One such device is described in U.S. Pat. No. 5,816,610 issued to Higashiura et al. on Oct. 6, 1998. Higashiura et al. describes a seat structure having a side impact airbag apparatus. A side bolster pad of the seat structure may be made from foam, in which case the airbag apparatus is surrounded by a lining member. The lining member has a perforation to facilitate its breaking when the airbag deploys. The side bolster itself is covered with a surface layer having a seam almost directly opposite the perforation in the lining member. In this way, the airbag deploys through the perforation in the lining member, breaks through the foam of the seat pad, and exits the seat structure through the seam in the surface layer. One limitation of the seat structure described in Higashiura et al. is that the airbag must deploy through the seat pad before exiting the seat structure. In particular, the airbag, which may be moving with very high velocity, impacts the foam seat pad as it exits the seat structure. This can cause pieces of the seat pad to be expelled from the seat as the airbag exits the seat cover. Therefore, a need exists for a seat assembly that includes protection for the seat pad from the deploying airbag.

Another device is described in U.S. Pat. No. 6,045,151 which issued to Wu on Apr. 4, 2000. Wu describes a seat assembly including a side airbag with a force concentrator that surrounds the airbag to concentrate and direct the force of the inflating airbag by a pre-determined deployment seam so that the seam may rupture and allow the airbag to deploy therethrough. Wu discloses two embodiments of the force concentrator: (1) a layer of sheet material joined to the inside of the trim cover; and (2) a sleeve or pocket of sheet material which entirely surrounds the airbag module. '151 patent, col. 2, lines 51-65.

SUMMARY OF THE INVENTION

The prior art leaves at least partially unsolved the problem of designing and assembling vehicle seats with a side airbag that can be deployed consistently, regardless of the physical properties of the seat trim cover and seat foam pad.

It would be useful to have a seat with a side airbag, the deployment of which does not vary significantly over time, regardless of the extent of wear and imperfection or damage sustained by the trim cover.

The present invention provides a vehicle seat assembly including a seat pad and a multiple panel pad shield configured to facilitate the manufacturing process and protect the seat pad during deployment of an airbag from within the side bolster.

The invention further provides a vehicle seat assembly including a frame for mounting the seat to the vehicle. A seat pad is disposed proximate the frame. A trim cover is disposed at least partially over the seat pad, and includes a seam adjacent a side of the seat pad. An airbag assembly is provided, which includes an airbag and an inflator which is configured to supply gas to the airbag, thereby facilitating its deployment. A pad shield covers at least a portion of the seat pad for protecting the seat pad during deployment of the airbag. The pad shield includes multiple panels—preferably, inner and outer panels—that form a deployment channel therebetween for the airbag, thereby avoiding contact of the airbag with the seat pad during deployment during expansion.

The panels of the pad shield cooperate with each other such that deployment of the airbag along the deployment channel moves a portion of the seat pad away from the deploying airbag, while the pad shield inhibits contact between the seat pad and the deploying airbag. The orientation of the deployment channel facilitates deployment of the airbag through the seam in the trim cover so that substantially all of the deployment forces are directed to the deployment channel, thereby increasing the speed at which the airbag deploys.

BRIEF DESCRIPTION OF THE DRAWINGS

FIG. 3 is a quartering perspective view of the panels in isolation from the view of FIG. 1 with the airbag and housing removed, in which the panels are attached to a structural member of the seatback;

FIG. 4 resembles the view of FIG. 3 illustrating the panels in isolation from the attachment relationship shown in FIG. 3;

FIG. 5 is a sectional view of the inner and outer panels in the seat assembly shown in FIG. 1, taken through the line A-A, in which the inner panel is fastened to an airbag screw connection point and the outer panel is fastened alternatively by a detachable attachment;

DETAILED DESCRIPTION OF THE PREFERRED EMBODIMENT(S)

The invention relates to the integration of a multi-part, preferably a two-part panel—the inner and the outer panel—in a rear backrest of a seat that is mounted in a vehicle. As used herein, the terms "inner" and "outer" respectively are used in relation to proximity to the vehicle seat occupant and the vehicle door.

Figure 1:
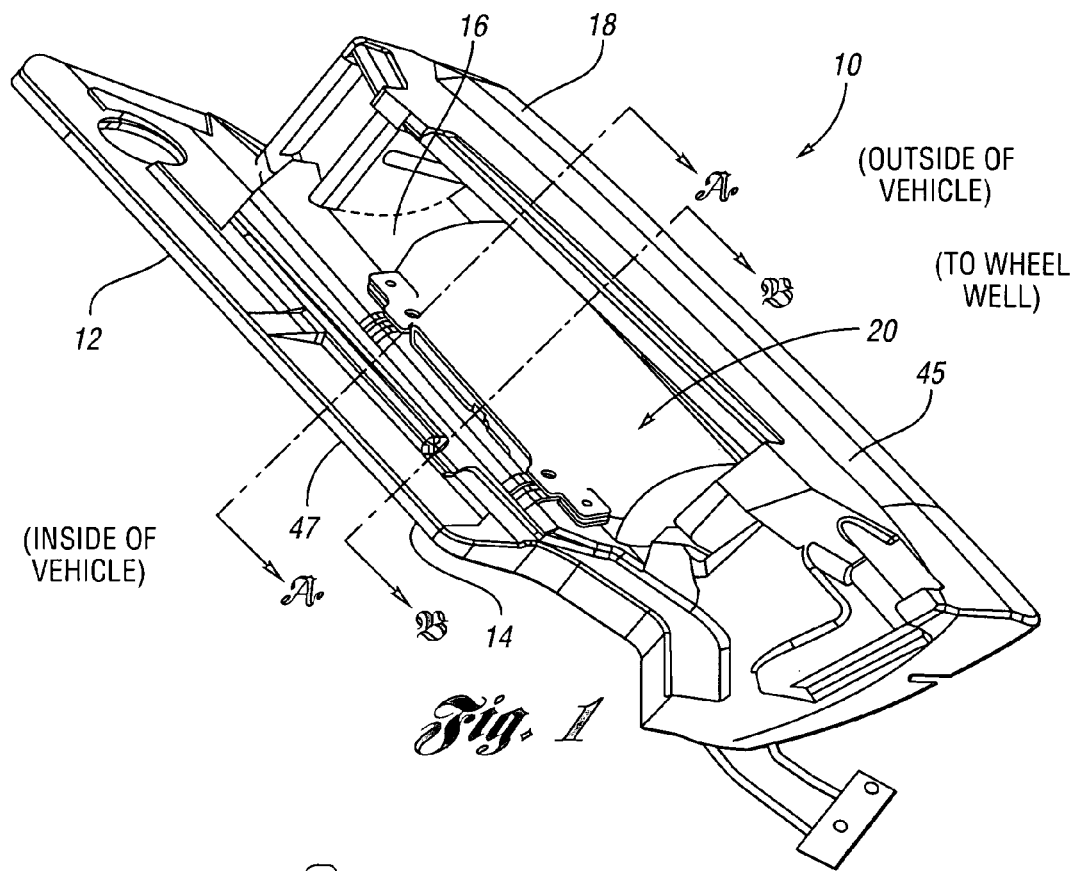
FIG. 1 is a quartering perspective view of a portion of the backrest of a seat assembly in accordance with the present invention.

FIG. 1 shows a portion—for example, a rear side bolster—of a seat assembly 10 in accordance with the present invention. It should be realized that although a rear side bolster is illustrated, the invention is not so limited. The invention can reside in any seatback. The seat assembly 10 includes a side bolster 12 and seat pad 16 that is at least partially covered by a trim cover 18. The seat pad 16 preferably is made from a molded polymeric material, such as a polyurethane foam. The use of a polymeric foam material to construct the seat pad 16 is cost effective and provides the flexibility needed to change the shape of the seat pad for different types of seat assemblies. Of course, other types of polymeric materials may be molded to form the seat pad 16.

Figure 2:
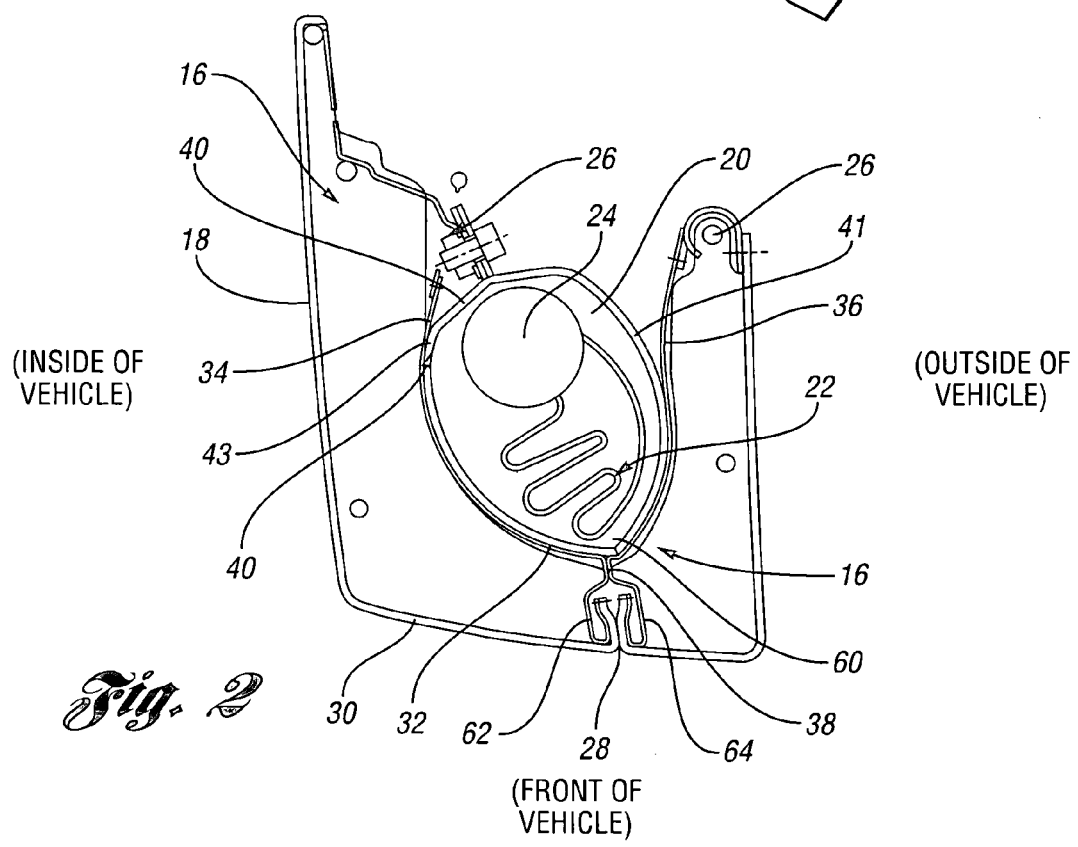
FIG. 2 is a sectional view of inner and outer panels of a pad shield located in the seat assembly shown in FIG. 1, taken through the line A-A.

Disposed within the side bolster 12 is an airbag assembly or module 20. As shown in FIG. 2, the airbag assembly 20 includes an airbag 22 and an inflator 24, which is configured to supply gas to the airbag 22, thereby facilitating deployment of the airbag 22. Also shown in FIG. 2 is a portion of a seat frame 26 which can be used for mounting the airbag assembly 20 to the seat assembly 10. The seat pad 16 is disposed proximate the frame 26 and may be directly attached to the frame 26 at various locations.

The trim cover 18 includes a seam 28 which is adjacent to a side 30 or another side of the seat pad 16. It should be appreciated that the seam 28 is a tear seam that could be located on the trim in front of the module or at other locations that are generally in the direction of deployment of the airbag from the module. Covering at least a portion of the seat pad 16 is a pad shield 32 which protects the seat pad 16 during deployment of the airbag 22. Inner (first) and outer (second) panels also have the function of directing the force of the deploying airbag directly into the tear seam. The forces of deployment are initially directed against members by which the housing is secured in relation to the frame of the seat. The deployment forces then are exerted against the panels 34, 36, thereby focusing deployment forces upon the seam 28 without significant diversion. Comprising inner 34 and outer 36 panels, the pad shield 32 may be made from any material effective to protect the seat pad 16 during deployment of the airbag 22. For example, a woven or non-woven cloth material, which may include natural or synthetic materials such as nylon. One material that is found to be effective is a polyamide material, of the type from which the airbag 22 may be manufactured. Regardless of the type of material used to make the pad shield 32, the use of the pad shield 32 can reduce friction on the airbag 22 as it deploys. Although a polymer such as nylon may be particularly beneficial, even a fleece material will help reduce the friction on the airbag 22. This is because the pad shield 32 inhibits contact between the deploying airbag 22 and the seat pad 16.

In the embodiment shown in FIG. 2, the pad shield 32 is effective to prohibit all contact between the deploying airbag 22 and the seat pad 16. This helps to prevent energy loss from the airbag 22 by decreasing friction and protecting the seat pad 16 from damage. This, in turn, helps to reduce the deployment time for the airbag 22.

As shown in FIG. 2, the pad shield 32 includes inner and outer panels 34, 36 which form a deployment channel 38 for the airbag 22. As the airbag 22 deploys from the housing 40 through the deployment channel 38, the pad shield 32 inhibits contact between the airbag 22 and the seat pad 16. Thus, portions of the seat pad 16 are moved away from the airbag 22 as it deploys through the deployment channel 38.

The deployment channel 38 is oriented to facilitate deployment of the airbag 22 through the seam 28 in the trim cover 18.

In particular, the airbag assembly 20 includes a housing 40 which at least partially surrounds the airbag 22 and the inflator 24. The housing 40 can resemble a clamshell cover with its split line oriented toward the tear seam 28. The housing 40 includes a frangible portion 60 which is easily broken by the airbag 22 as it deploys. The frangible portion 60 is disposed opposite the deployment channel 38 to facilitate deployment of the airbag along the channel 38 and out from the seam 28. Although the airbag housing 40 comprises a relatively rigid material, in other embodiments, a thin sheet of material may be used in place of a rigid housing. In such embodiments, the sheet may contain a frangible portion, as its properties will be such that it will tear as the airbag 22 deploys.

As shown in FIGS. 2-3, the inner and outer panels 34, 36 of the pad shield 32 respectively include ends 62, 64 that are attached to the trim cover 18 at the seam 28. This configuration helps to facilitate deployment of the airbag 22 through the seam 28. The deployment channel 38 opens as the airbag 22 is deployed, thereby causing the panels 34, 36 to exert an outward force on the trim cover 18 at the seam 28. This helps to open the seam 28 and provide an exit path for the airbag 22.

The airbag seam 28 is sewn through edges 62 and 64 with both sides of the trim between them. It will thus be appreciated that the seam 28 extends between all four layers.

As mentioned earlier, the pad shield 32 includes two separate panels 34, 36. In FIG. 3 the end 62 of the inner panel 34 of the pad shield 32 is attached at the seam 28 (FIG. 2) of the trim cover 18. A distal end 63 of the inner panel 34 of the pad shield 32 is attached to the back 43 of the airbag housing 40, between the seat frame 26 and the airbag housing 40. This provides a convenient means for securely attaching the inner panel 34 of the pad shield 32. Similarly, the seam end 64 of the outer panel 36 of the pad shield 32 is attached at the seam 28 of the trim cover 18. A distal end 65 of the outer panel 36 of the pad shield 32 may be attached to a secure location 26 within the seat assembly 10, such as a point on the seat frame 26. Thus, the pad shield 32 not only provides a deployment channel for the airbag 22, but also protects the seat pad 16 from damage during high velocity deployment.

FIG. 4 portrays the inner 34 and outer 36 panels that are depicted in FIG. 3 except in isolation from the back 43 of the airbag housing. FIG. 4 also depicts holes 66 that are used to fasten the inner panel 34 and thus the airbag module with a screw to the seat frame 26. Also shown in FIG. 4 is a tear seam 68 that ruptures during airbag deployment. At the distal end 65 of the outer panel 36, there is a retainer 70 that is used to attach the outer panel 36 to the seat frame 26 (FIG. 2). If desired, fleece or a comparable material may be provided along a strip portion 72 (FIG. 3).

Turning now to FIG. 5, there is depicted a sectional view taken along line A-A of FIG. 1. For simplicity, the airbag module has been omitted. In the embodiment depicted in FIG. 5, the inner 34 and/or outer 36 panels are fastened by a VELCRO® fastener or other detachable attachment means to the foam seat pad 16. Noteworthy in this embodiment is that the outer panel 36 does not extend upwardly toward the seat frame 26 for attachment, thereby realizing a saving in material costs. Also, the inner panel 34 need not extend beyond the retainer 71.

Figure 6A:
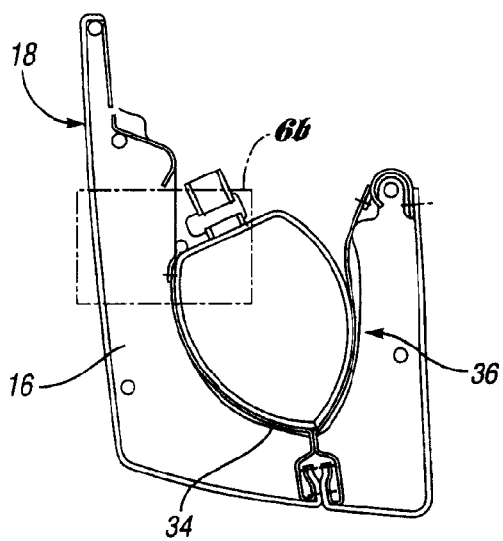
FIG. 6 resembles the view of FIG. 5, illustrating an alternate embodiment wherein the inner panel is clamped between foam and an airbag module by an end retainer; the detailed view illustrates a clamped retainer end located between the airbag module and foam.
Figure 7A:
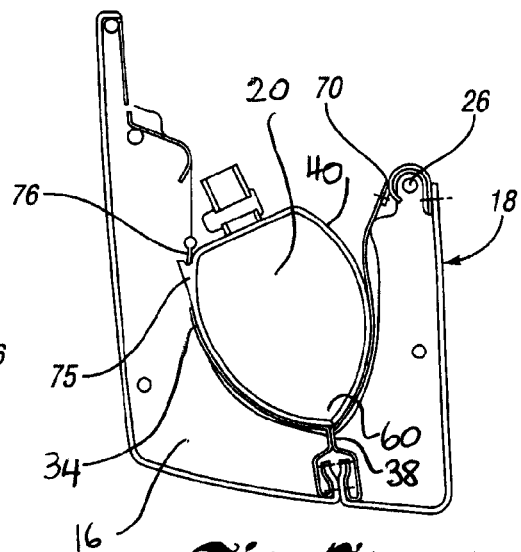
FIG. 7 resembles the view of FIG. 5, illustrating an alternate embodiment wherein the inner panel is fastened by link plates associated with the airbag module; the detailed view shows a fastening mechanism that is provided by adding link plates to the airbag module.
Figure 6B:
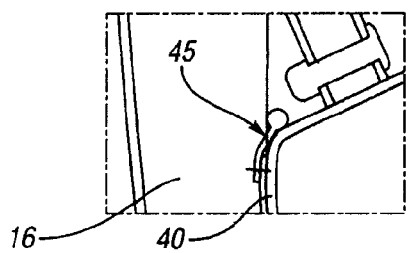
Figure 7B:
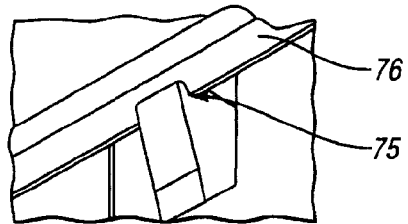

In FIGS. 6 and 7, the inner panel 34 is clamped between foam 16 and the airbag module. Additional detail is shown in the enlarged views that respectively are associated with FIGS. 6-7. In FIG. 6, the reference numeral 45 identifies a clamped retainer that secures the housing 40 in relation to the foam 16. The retainer 45 whose shape is not limited to that shown is also depicted in FIG. 3. In FIG. 7, the outer panel 36 is optionally fastened through a portion of the seat frame 26 via a retainer 70.

Figure 8:
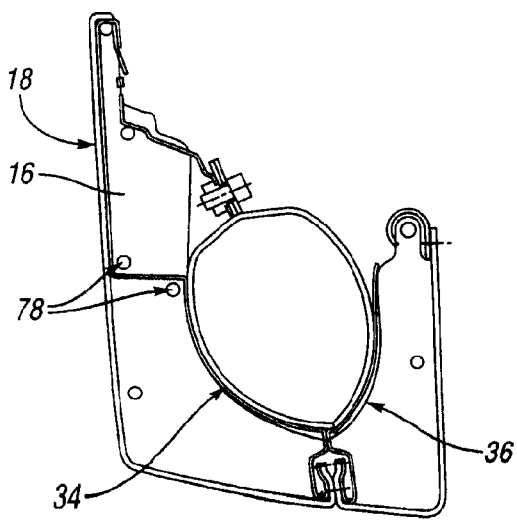
FIG. 8 is a sectional view of the vehicle seatback of FIG. 1 taken along the line A-A, wherein during assembly, the inner panel is fed through slitted foam and fastened under the cover.
Figure 9:
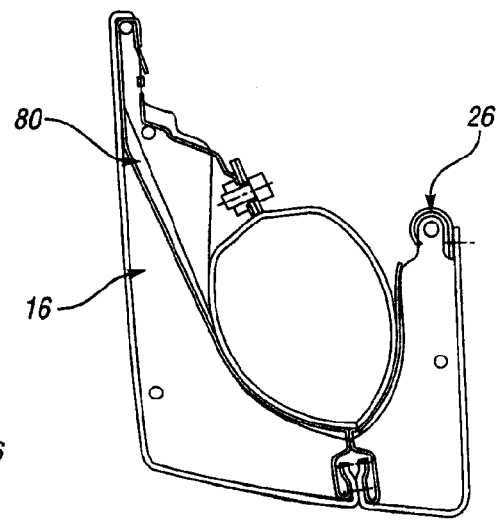
FIG. 9 is an alternative embodiment of the view depicted in FIG. 8, wherein the foam is slitted in a draft direction with a small undercut and in which the outer panel is alternatively fastened to the seatback structure.

FIGS. 8-9 depict alternate embodiments of the invention wherein the inner panel 34 during assembly is fed through a slit 80 in the foam 16. Elements of the wire frame 78 (FIG. 8) are added. In FIG. 9, the foam seat pad is provided with a slit 80 in a draft direction. The slit is provided with a small undercut so that the inner panel during assembly may be fed therethrough.

It should be appreciated that the structure and methodology described for positioning a pad, trim, and an airbag module in relation to a bolster could with good effect also be used for positioning those components in relation to a seatback or the seat itself.

One methodology by which the pad, trim, and airbag module may be affixed to a side bolster is as follows:

A. Placing the bolster, which includes the wire frame that preferably is molded in situ, with the deployment channel opening upwardly;

B. Placing the trim on top of the bolster, while aligning the airbag seam with the opening of the deployment channel;

C. Feeding the panels, which are sewn to the trim, into and through the deployment channel;

D. Affixing the trim to the bolster (e.g., by retainers or other fasteners);

E. Mounting the inner panel to the wire frame in any of the ways shown in FIGS. 3-9;

F. Fastening the outer panel to the wire frame or as shown in FIG. 5;

G. Placing the airbag module between the inner and outer panels, and into the cavity of the bolster; and H. Feeding the threaded bolts (first through the holes of the airbag housing, then through the holes of the inner panel), then into the threaded holes of the bracket of the wire frame. Other mounting alternatives are depicted in FIGS. 3-9.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:
a frame for mounting the seat assembly to a vehicle;
a seat pad disposed proximate the frame, the frame lying outside the seat pad;
a trim cover disposed over at least a part of the seat pad and including a seam adjacent a side of the seat pad;
an airbag assembly, including an airbag and an inflator configured to supply gas to the airbag, thereby facilitating deployment of the airbag, the airbag assembly also including a clamshell housing at least partially surrounding the airbag to facilitate deployment of the airbag along the deployment channel; and
a pad shield covering at least a portion of the seat pad for protecting the seat pad during the deployment of the airbag, the pad shield being sewn to the trim cover at the seam and including inner and outer panels and forming a deployment channel that extends continuously to the seam therebetween for the airbag, the pad shield being located between the frame and the seam, wherein the inner and outer panels of the pad shield each include one end attached to the trim cover at the seam and a second end that is attached to separated wire frame members wherein a link plate extends from a distal end of the clamshell housing and an ear extends from a wire frame member, the link plate engaging the ear to secure the inner panel thereto so that the second ends of the inner and outer panels are open behind the airbag, thus facilitating mounting thereof and lowering airbag insertion forces applied during assembly.

2. The vehicle seat assembly of claim 1, wherein the deployment channel is oriented to facilitate deployment of the airbag through the seam in the trim cover.

3. The vehicle seat assembly of claim 1, wherein the panels cooperate to form the deployment channel proximate the front of the airbag housing.

4. The vehicle seat assembly of claim 3, wherein the panels and the trim are sewn together by the airbag seam.

5. The vehicle seat assembly of claim 1, wherein the outer panel is fastened through a portion of the seat frame via a retainer.

6. The vehicle seat assembly of claim 1, wherein a distal end of the inner panel is interposed between the seat pad and a clamshell cover of the airbag assembly.

7. A vehicle seat assembly, comprising:
a frame for mounting the seat assembly to a vehicle;
a seat pad disposed proximate the frame, the frame lying outside the seat pad;
a trim cover disposed over at least a part of the seat pad and including a seam adjacent a side of the seat pad;
an airbag assembly, including an airbag and an inflator configured to supply gas to the airbag, thereby facilitating deployment of the airbag, the airbag assembly also including a clamshell housing at least partially surrounding the airbag to facilitate deployment of the airbag along the deployment channel; and
a pad shield covering at least a portion of the seat pad for protecting the seat pad during the deployment of the airbag, the pad shield being sewn to the trim cover at the seam and including inner and outer panels and forming a deployment channel that extends continuously to the seam therebetween for the airbag, the pad shield being located between the frame and the seam, wherein the inner and outer panels of the pad shield each include one end attached to the trim cover at the seam and a second end that is attached to separated wire frame members so that the second ends of the inner and outer panels are open behind the airbag, thus facilitating mounting thereof and lowering airbag insertion forces applied during assembly wherein a distal end of the inner panel is fastened to a wire frame by a link plate extending from the clamshell housing of the airbag assembly.

* * * * *